(12) United States Patent
Morgan

(10) Patent No.: US 8,360,111 B1
(45) Date of Patent: Jan. 29, 2013

(54) METHOD FOR SQUEEZING A FRUIT WEDGE

(76) Inventor: Dawn Lynn Morgan, Hodgkins, IL (US)

(*) Notice: Subject to any disclaimer, the term of this patent is extended or adjusted under 35 U.S.C. 154(b) by 114 days.

(21) Appl. No.: 13/153,396

(22) Filed: Jun. 4, 2011

Related U.S. Application Data

(60) Continuation-in-part of application No. 12/329,554, filed on Dec. 6, 2008, now abandoned, and a division of application No. 11/381,752, filed on May 5, 2006, now abandoned.

(51) Int. Cl.
*B65B 1/00* (2006.01)

(52) U.S. Cl. ............... 141/2; 141/97; 141/337; 141/366

(58) Field of Classification Search .......... 141/97, 141/114, 231, 331, 339, 343, 345, 363, 366, 141/2, 337; 100/27, 104, 133, 136, 211
See application file for complete search history.

(56) References Cited

U.S. PATENT DOCUMENTS

| | | | | | |
|---|---|---|---|---|---|
| 2,688,914 A | * | 9/1954 | Eckler | ............ | 100/211 |
| 2,924,253 A | * | 2/1960 | Beddow | ............ | 141/337 |
| 3,159,096 A | * | 12/1964 | Tocker | ............ | 100/211 |
| 3,669,013 A | * | 6/1972 | Stein | ............ | 100/211 |
| D299,302 S | * | 1/1989 | Gray | ............ | D7/700 |
| 6,112,781 A | * | 9/2000 | Baxter | ............ | 141/391 |
| 2004/0069373 A1 | * | 4/2004 | Willis | ............ | 141/337 |

* cited by examiner

*Primary Examiner* — Gregory Huson
*Assistant Examiner* — Jason K Niesz
(74) *Attorney, Agent, or Firm* — Freedman Patent

(57) ABSTRACT

A method for squeezing at least one fruit wedge, including providing at least one fruit wedge, providing a disposable funnel having substantially circular cross-section formed from a substantially stretchable material, the disposable funnel having an inlet and an outlet, inserting the fruit wedge through the inlet of the disposable funnel until the fruit wedge is substantially enclosed by the disposable funnel, providing a bottle having a neck, inserting the outlet of the disposable funnel into or stretching the disposable funnel over the neck of the bottle, squeezing the disposable funnel until juice separated from the fruit wedge is squirted through the outlet into the bottle and, squeezing the disposable funnel with sufficient force so that the fruit wedge is expelled from the funnel to substantially reside in the bottle.

13 Claims, 11 Drawing Sheets

METHOD FOR SQUEEZING A FRUIT WEDGE

CROSS-REFERENCE TO RELATED APPLICATIONS

This application is a continuation-in part of U.S. patent application Ser. No. 12/329,554, filed Dec. 6, 2008, which is a divisional of U.S. patent application Ser. No. 11/381,752, filed May 5, 2006.

BACKGROUND OF THE INVENTION

Apparatus and methods for squeezing fruit wedges to separate juice have come into widespread use. Many people experience being squirted in the eye by lemon juice while attempting to squirt a lemon wedge into a beer bottle, water bottle, tea cup or baking receptacle. If the lemon wedge is squeezed by a hand operated juicer, sharing a lemon wedge with multiple people can be somewhat unsanitary if protective gloves are not readily available. A partially squeezed lemon wedge intended for re-use is typically stored separately from the juicer during refrigeration. Moreover, currently available juicers often have bulky and complex construction with several moving parts and are somewhat expensive to manufacture.

Problems addressed by this disclosure pertain to keeping a natural person's hands clean while squeezing a fruit wedge and, keeping the juice from squirting beyond an intended target such as a beer bottle, water bottle, tea cup or baking receptacle. Additional problems addressed by this disclosure pertain to directing the juice to where a natural person wants it to go, allowing multiple natural persons to share a fruit wedge in a sanitary manner and, supporting re-use of a fruit wedge that has been stored in the apparatus during refrigeration. It is desirable that the apparatus can be disposable, inexpensive to manufacture, have few moving parts for ease of manufacture and reliability and, support advertising materials embossed into the apparatus, marked or printed on its surface. It is also desirable that the apparatus be capable of being squeezed by a machine.

DESCRIPTION OF RELATED ART

U.S. Pat. No. 2,789,496 discloses a fruit slice holder and juice squeezer of complex construction comprising a one-piece body of flexible material having plane side wall members, geometrically similar plane end wall members each having an upper portion in the shape of a circular segment, an intermediate portion in the shape of an isosceles trapezoid, a lower portion of substantially rectangular configuration and, aligned slots in opposite walls adapted to position the device for support on the rim of a receptacle.

U.S. Pat. No. 587,860 discloses a lemon squeezer. The apparatus has complex construction with moving parts, is unlikely to keep a natural person's hands clean while squeezing a fruit wedge, is intended for multiple use and, does not allow a natural person to easily direct the juice where they want it to go.

U.S. Pat. No. 93,382 discloses an improvement in washing machines comprising a cylindrical case with a door, turning eccentrically on journals, and provided with wedge-shaped ribs, hollow journal, drip-pipe and handle. Although this apparatus could, in principle, be used to squeeze fruit wedges, it is of complex construction with several moving parts and is intended for multiple use.

U.S. Pat. No. 331,236 discloses a lemon squeezer combining a bowl having a handle and a presser provided with a handle, stem and trunnions. This apparatus is of complex construction with moving parts wholly made of metal, is unlikely to keep a natural person's hands clean while squeezing a fruit wedge, is intended for multiple use and, does not allow a natural person to easily direct the juice where they want it to go.

U.S. D468,975 discloses the ornamental design for a hand operated citrus squeezer. This apparatus of complex construction with moving parts made of plastic, is unlikely to keep a natural person's hands clean while squeezing a fruit wedge, is intended for multiple use and, does not allow a natural person to easily direct the juice where they want it to go.

U.S. D437,741 discloses the ornamental design for a citrus squeezer. This apparatus has a separate lid and base, is unlikely to keep a natural person's hands clean while squeezing a fruit wedge, is intended for multiple use and, does not allow a natural person to easily direct the juice where they want it to go.

U.S. D311,479 discloses the ornamental design for a hand operated fruit juicer. This apparatus has complex construction with moving parts, is unlikely to keep a natural person's hands clean while squeezing a fruit wedge, is intended for multiple use and, does not allow a natural person to easily direct the juice where they want it to go.

U.S. D299,803 discloses the ornamental design for a lemon squeezer. This apparatus has complex construction with moving parts, is unlikely to keep a natural person's hands clean while squeezing a fruit wedge, is intended for multiple use and, does not allow a natural person to direct the juice where they want it to go.

U.S. D273,551 discloses the ornamental design for a lemon squeezer. This apparatus has complex construction with moving parts, is unlikely to keep a natural person's hands clean while squeezing a fruit wedge, is intended for multiple use and, does not allow a natural person to direct the juice where they want it to go.

U.S. D167,692 discloses the ornamental design for a juice extractor. This apparatus has complex construction with moving parts, is unlikely to keep a natural person's hands clean while squeezing a fruit wedge, is intended for multiple use and, does not allow a natural person to direct the juice where they want it to go.

U.S. D124,195 discloses the ornamental design for a fruit squeezer. This apparatus has complex construction with moving parts, is unlikely to keep a natural person's hands clean while squeezing a fruit wedge, is intended for multiple use and, does not allow a natural person to direct the juice where they want it to go.

U.S. Pat. No. 4,531,457 discloses a two piece juicer. This apparatus has complex construction with moving parts, is unlikely to keep a natural person's hands clean while squeezing a fruit wedge, is intended for multiple use and, does not allow a natural person to direct the juice where they want it to go.

U.S. Pat. No. 2,881,696 discloses a fruit slice juice extractor. This apparatus has complex construction with moving parts is unlikely to keep a natural person's hands clean while squeezing a fruit wedge, is intended for multiple use and, does not allow a natural person to direct the juice where they want it to go.

U.S. Pat. No. 2,829,588 discloses a lemon slice squeezer. This apparatus has complex construction with moving parts, is unlikely to keep a natural person's hands clean while squeezing a fruit wedge, is intended for multiple use and, does not allow a natural person to direct the juice where they want it to go.

U.S. Pat. No. 2,735,360 discloses lemon slice squeezers. This apparatus has complex construction with moving parts is unlikely to keep a natural person's hands clean while squeezing a fruit wedge, is intended for multiple use and, does not allow a natural person to direct the juice where they want it to go.

U.S. Pat. No. 1,959,615 discloses a fruit squeezer. This apparatus has complex construction with moving parts is unlikely to keep a natural person's hands clean while squeezing a fruit wedge, is intended for multiple use and, does not allow a natural person to direct the juice where they want it to go.

U.S. Pat. No. 1,117,122 discloses a lemon squeezer. This apparatus has complex construction with moving parts is unlikely to keep a natural person's hands clean while squeezing a fruit wedge, is intended for multiple use and, does not allow a natural person to direct the juice where they want it to go.

U.S. Pat. No. 713,084 discloses a lemon squeezer. This apparatus has complex construction with moving parts, is unlikely to keep a natural person's hands clean while squeezing a fruit wedge, is intended for multiple use and, does not allow a natural person to direct the juice where they want it to go.

Hence there is a long felt need for an apparatus for squeezing fruit wedges which keeps a natural person's hands clean while squeezing a fruit wedge and keeps the juice from squirting beyond an intended target, allows a natural person to direct the juice to where they want it to go, allows multiple natural persons to share a fruit wedge in a sanitary manner, allows a fruit wedge to be pre-cut and ready for use at a party, restaurant or bar, is disposable and supports re-use of a fruit wedge that has been stored in the apparatus during refrigeration.

Furthermore, there is a long felt need for the apparatus to be inexpensive to manufacture, have few moving parts for ease of manufacture and reliability and, support advertising materials marked or printed on its surface for branding and increased revenue.

SUMMARY OF THE INVENTION

Exemplary embodiments of the present invention provide an apparatus which keeps a natural person's hands clean while squeezing at least one fruit wedge because the at least one fruit wedge is substantially enclosed in the non-porous disposable funnel of the apparatus while the at least one fruit wedge is being squeezed. The lower body portion and outlet of the disposable funnel help to ensure that juice separated from the at least one fruit wedge is substantially directed towards its intended target such as a beer bottle, water bottle, tea cup, baking receptacle or the like. Likewise, when squeezed with sufficient force the fruit wedge may be squeezed so that it substantially resides in the intended target such as a beer bottle, water bottle, tea cup, baking receptacle or the like. When the apparatus substantially encloses at least one fruit wedge and the closure is closed, multiple natural persons can share the at least one fruit wedge in a sanitary manner. In the presently preferred embodiment, the materials from which the disposable funnel is formed ensure that at least one fruit wedge can be refrigerated in the closed apparatus for re-use and, the apparatus is inexpensive to manufacture and, can be disposable, being formed from a balloon with the distal portion removed together with a closure such as is widespread in the art. The apparatus requires no separate moving parts to squeeze the fruit wedge, is of simple construction and, supports advertising materials marked or affixed to its surface for branding and increased revenue.

Like references indicate like parts in each drawing.

DETAILED DESCRIPTION OF THE VARIOUS EMBODIMENTS

The following terms are defined below:

adhesive: having the ability to stick things together.

balloon: a small-necked inflatable bag.

bottle: a rigid or semi-rigid container having a comparatively narrow neck.

closure: the part of a container where a seal is made.

disposable: designed to be thrown away after use with only negligible loss.

drawstring: a string, cord, or tape inserted into hems or casings or laced through eyelets for use in closing a bag.

dispnsable funnel: a utensil designed to catch and direct a downward flow of liquid.

fruit wedge: slice of fruit up to and including about a whole fruit.

inlet: an opening by which entrance is made.

non-porous: not permeable by liquids.

outlet: a channel through which a liquid flows.

rim: the outer edge or border of something.

squirt: to eject liquid in a thin spurt.

zip lock: having an interlocking groove and ridge that form a tight seal when pressed together.

Figure 1:
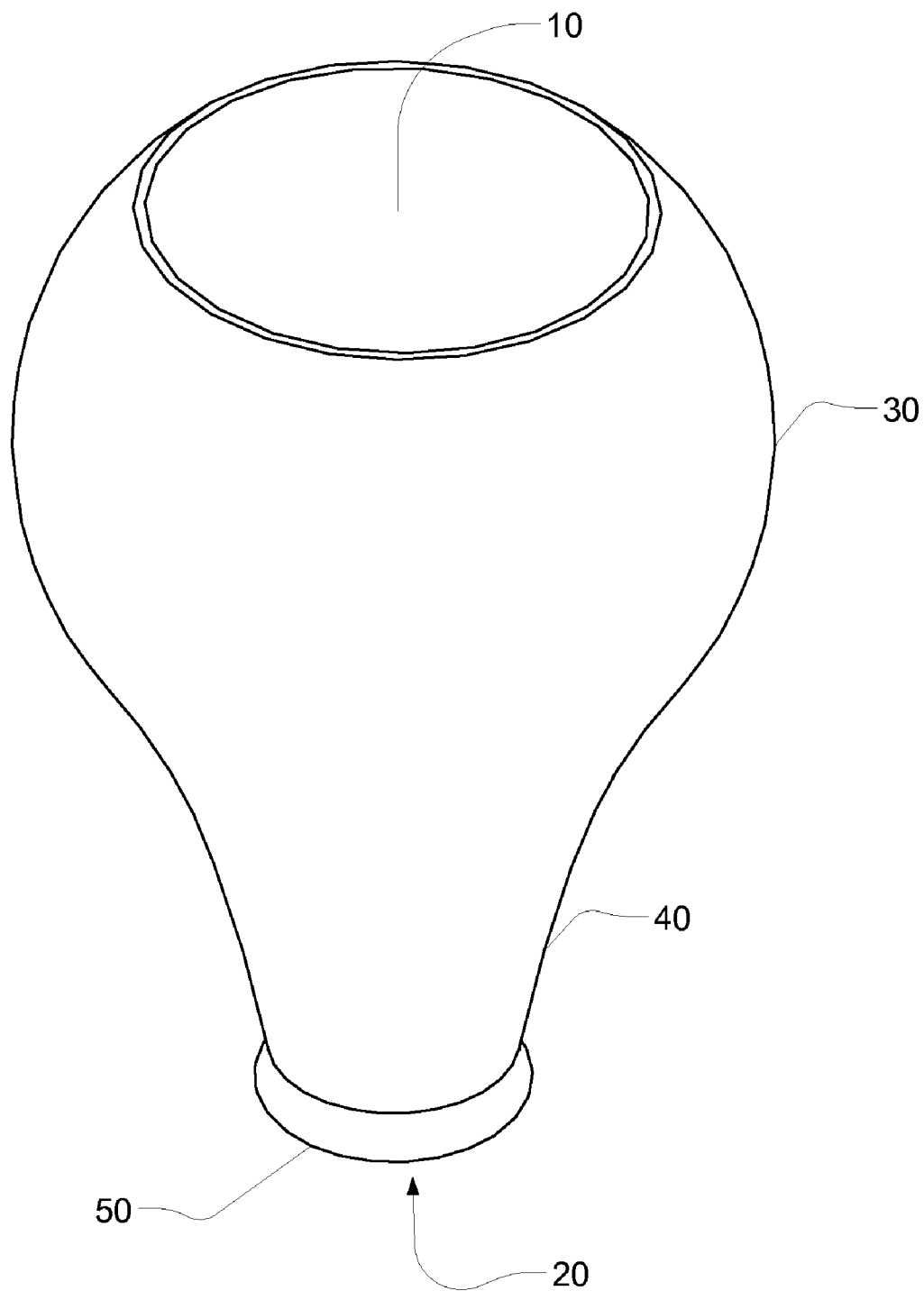
FIG. 1 shows an exemplary embodiment of a disposable funnel for squeezing a fruit wedge.

FIG. 1 shows an exemplary embodiment of a disposable funnel for squeezing fruit. In this embodiment, the disposable funnel is formed from a substantially non-porous and stretchable material, such as are known in the art, including an elastomer.

Suitable elastomers include natural and synthetic rubber, resilin and chlorosulfonated polyethylene, preferably such materials as well tolerate refrigeration with minimal degradation. In the presently preferred embodiment, the disposable funnel is formed by removing the distal portion of a balloon and has substantially circular cross-section.

In this embodiment, the disposable funnel has an inlet 10, an outlet 20, an upper body portion 30 and a lower body portion 40. Advertising indicia can embossed into, marked on or affixed to the disposable funnel. The lower body portion 40 has maximum diameter in the direction orthogonal to the longitudinal axis of the disposable funnel substantially less than the maximum diameter of the upper body portion 30 in the direction orthogonal to the longitudinal axis of the disposable funnel. In this embodiment, a rim 50 is formed of one piece with the lower body portion 40. In an alternative embodiment, a rim 50 is sealingly connected to the lower body portion 40 by an adhesive seal or any seal known in the art. In the presently preferred embodiment, the inlet 10 is about 2.5 inch in diameter, the upper body portion 30 is about 3 inches long and, the lower body portion 40 is about 0.5 inch long. In an alternative embodiment presently contemplated for fruit wedges from about a half fruit up to and including about a whole fruit, the inlet 10 is about 4.5 inch diameter, the upper body portion 30 is about 5 inch long and, the lower body portion 40 is about 0.5 inch long. In yet another embodiment a zip closure 55 is placed proximal to the outlet 20.

This disposable funnel is suitable for squeezing a fruit wedge until juice separated from the fruit wedge is squirted into a container or a bottle having a neck and for squeezing with sufficient force until the fruit is expelled through the outlet until it substantially resides in the container or bottle.

Fruit suitable for squeezing in the disposable funnel includes citrus fruit wedges such as lemon, lime, orange wedges and the like. Suitable bottles include beer bottles, water bottles and the like, such as are known in the art and, suitable containers include tea cups, baking receptacles and the like, such as are known in the art. The disposable funnel containing at least one fruit wedge can be cooled from about 70 degrees Fahrenheit to about 38 degrees Fahrenheit and reheated to about 70 degrees Fahrenheit with minimal degradation.

Figure 2:
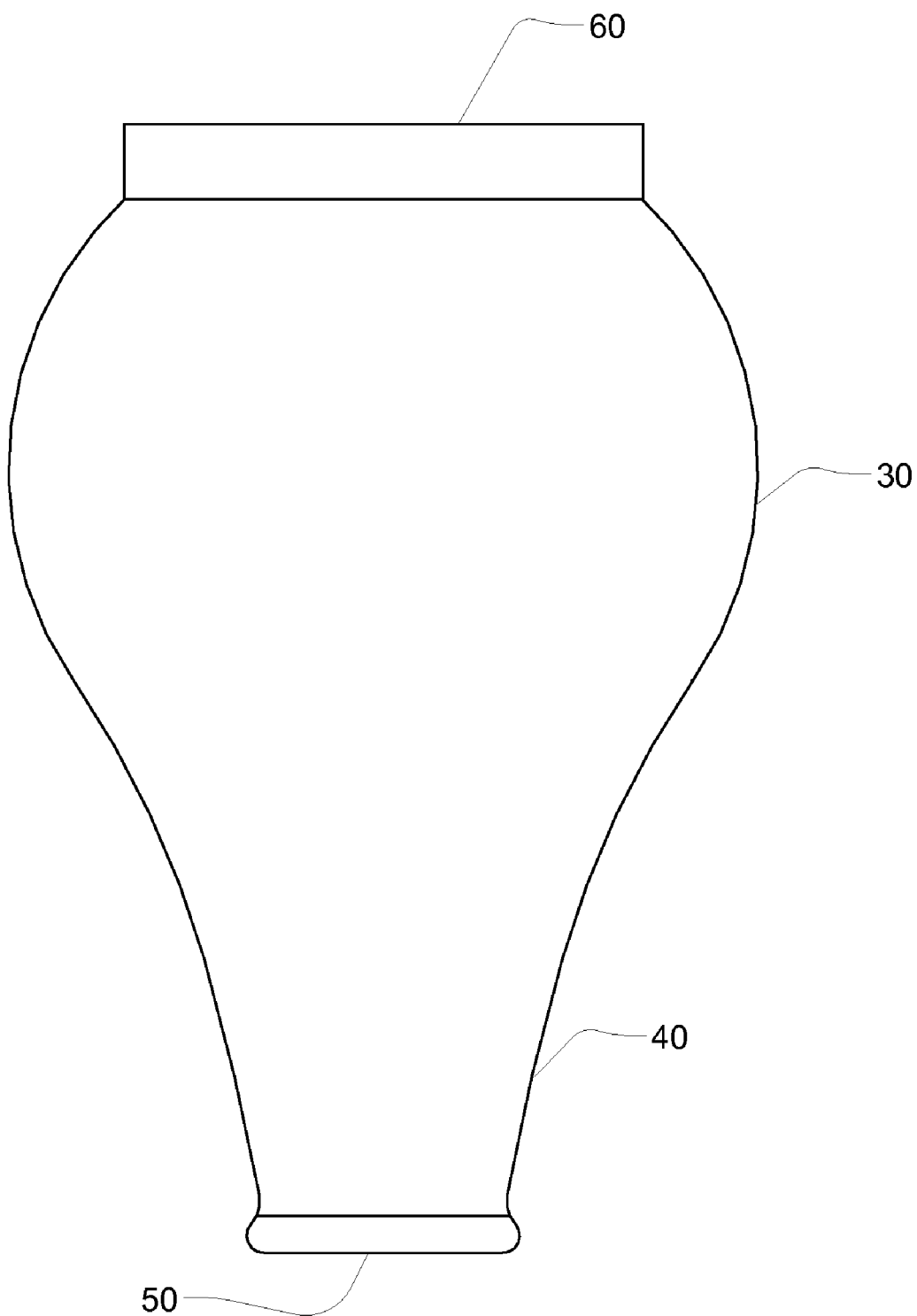
FIG. 2 shows an exemplary embodiment of a disposable funnel for squeezing a fruit wedge.

FIG. 2 shows yet another exemplary embodiment of the disposable funnel in which the inlet 10 is sealed by a closure 60. Suitable closures include zip lock, drawstring closure, adhesive closure including double-sided adhesive tape, and the like, and combinations thereof, as disclosed in U.S. Pat. No. 5,070,584 to Dais et al., U.S. Pat. No. 6,826,808 to Kutschka and any other closures such as are known in the art.

Figure 3:
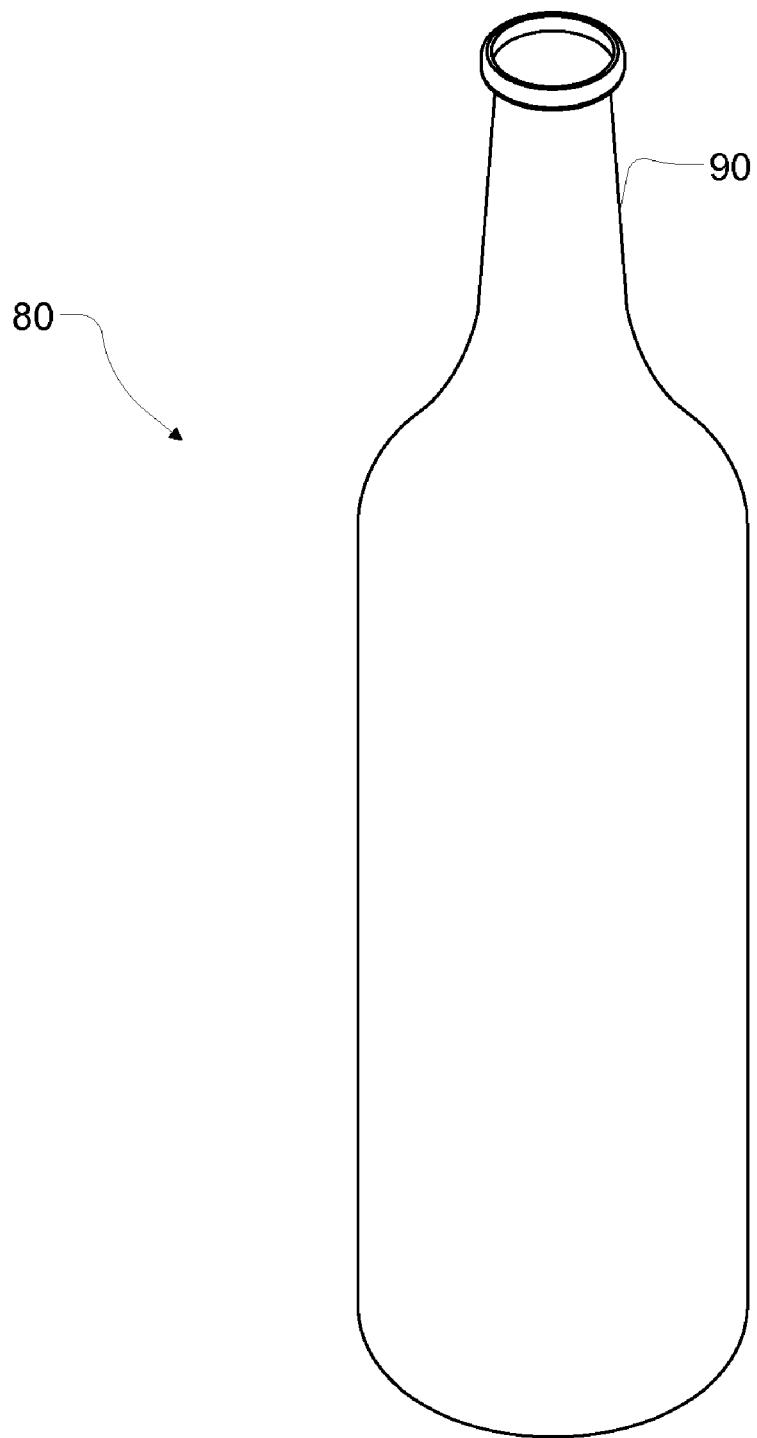
FIG. 3 shows an exemplary bottle having a neck.

FIG. 3 shows an exemplary bottle 80 having a neck 90, such as a beer bottle or the like.

Figure 4:
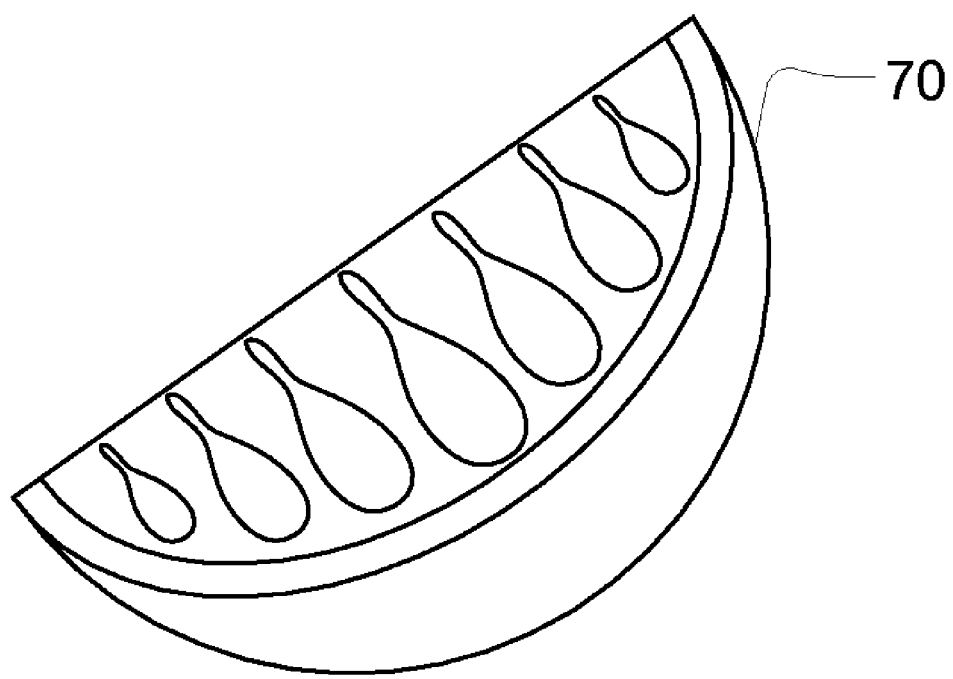
FIG. 4 shows an exemplary fruit wedge.

FIG. 4 shows an exemplary fruit wedge 70, such as a citrus wedge or the like.

Figure 5:
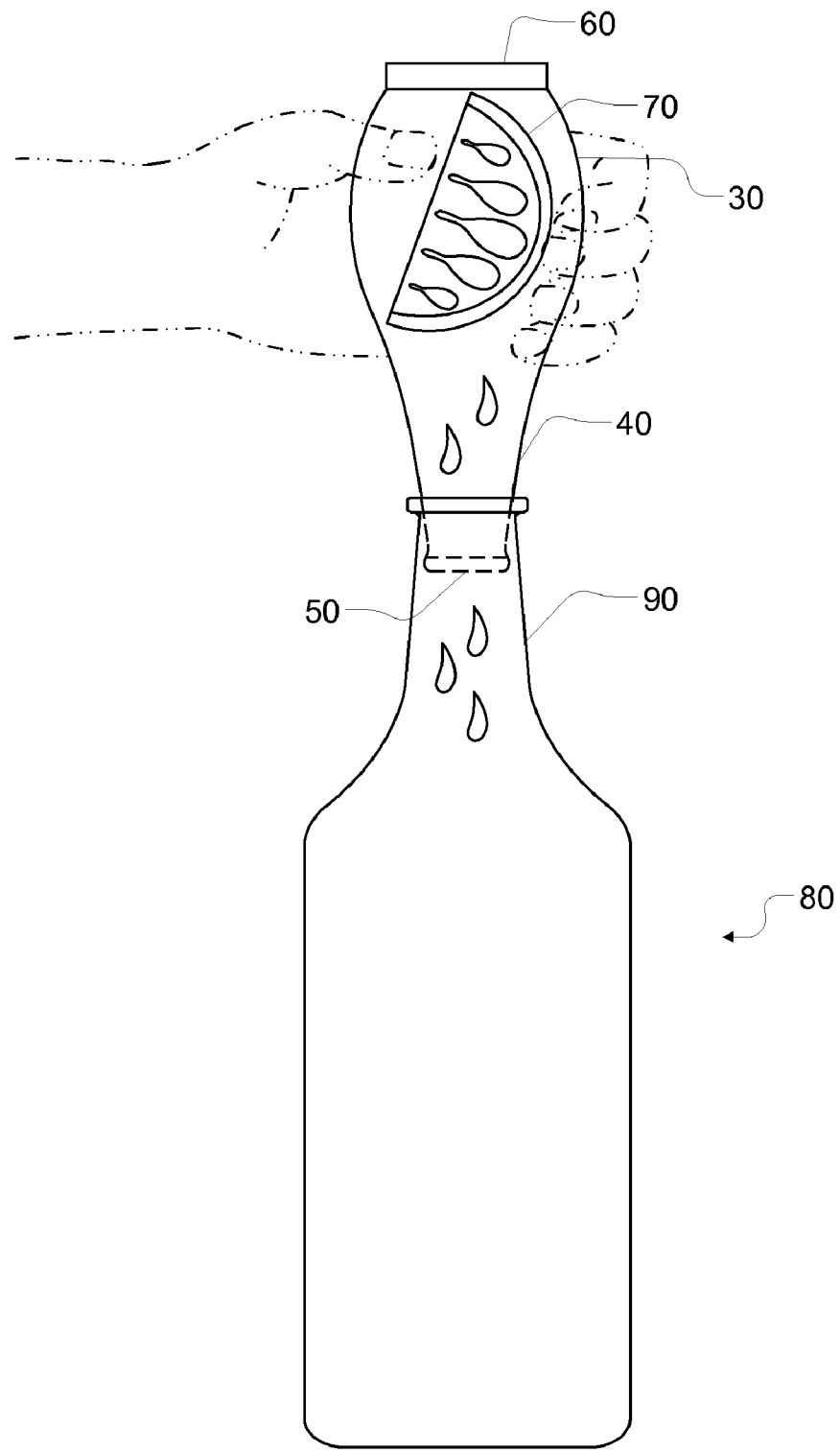
FIG. 5 shows an exemplary embodiment of a disposable funnel for squeezing a fruit wedge in operation.

FIG. 5 depicts an exemplary embodiment of an apparatus for squeezing fruit, in which a fruit wedge 70 is inserted through the inlet 10 and the outlet 20 inserted into a bottle having a neck. The disposable funnel has sufficient capacity to substantially enclose at least one fruit wedge. The inlet 10 is sized to receive at least one fruit wedge. The outlet 20 is adapted to fit into the neck of a bottle or container, such adaptations including any such as are known in the art including appropriate size and elasticity. In operation, the disposable funnel is squeezed until juice separated from the fruit wedge squirts into the bottle and, if squeezed with sufficient force, the fruit wedge may be expelled through the outlet to substantially reside in the bottle or container. In the embodiment that includes a zip closure 55 proximal to the outlet 20, the zip closure 55 may be closed so that a fruit wedge 70 may be enclosed in the disposable funnel for future use in a sanitary manner. After the fruit wedge 70 is inserted through the inlet 10, the fruit wedge need not be touched by hand and the entire apparatus can be re-used in a sanitary manner. In operation, the apparatus can be squeezed by machine or by hand as illustrated.

Figure 6:
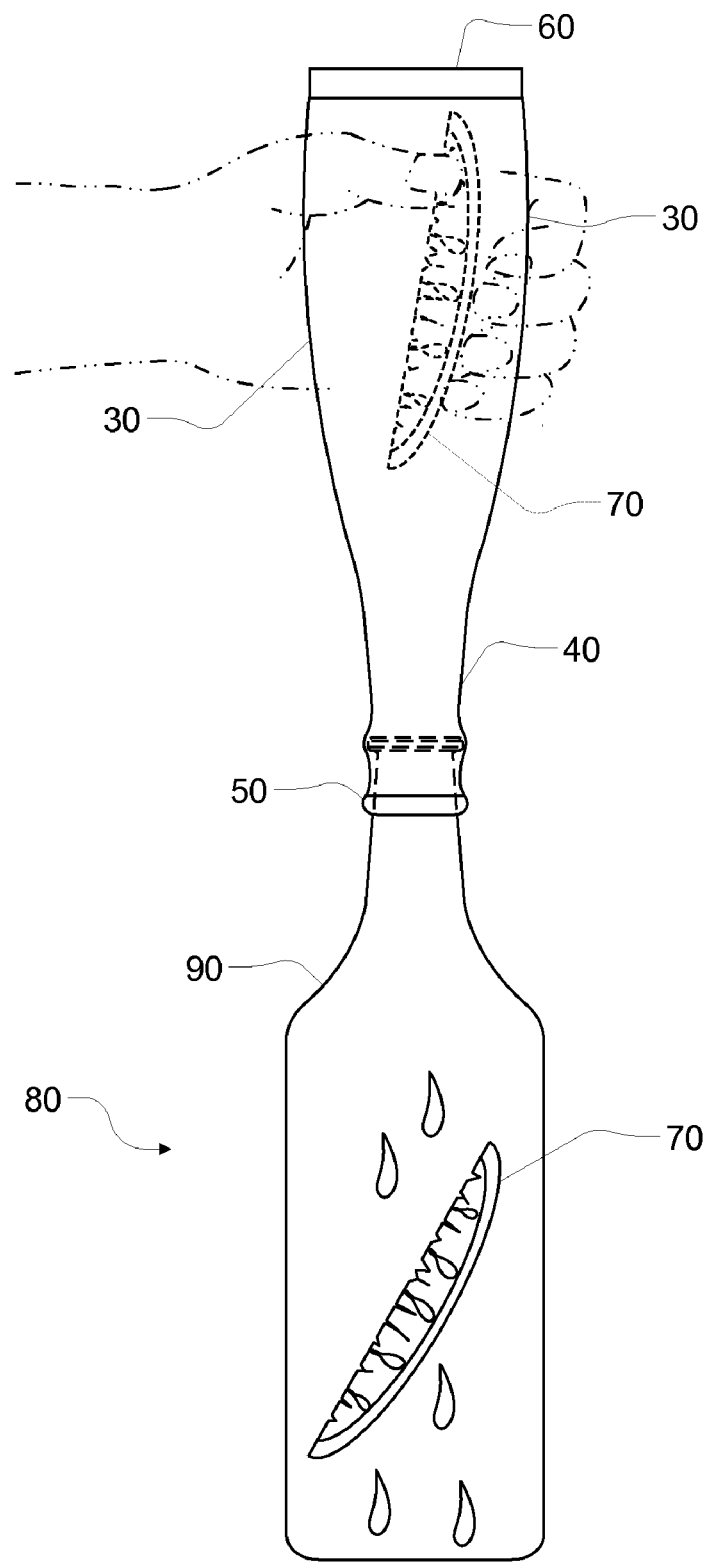
FIG. 6 shows an exemplary embodiment of an apparatus for squeezing a fruit wedge in operation.

FIG. 6 depicts an exemplary embodiment of an apparatus for squeezing fruit, in which a fruit wedge 70 is inserted through the inlet 10 and the outlet 20 stretched over a bottle having a neck. The disposable funnel has sufficient capacity to substantially enclose at least one fruit wedge. The inlet 10 is sized to receive at least one fruit wedge. The outlet 20 is adapted to stretch over the neck of a bottle or container, such adaptations including any such as are known in the art including appropriate size and elasticity. In operation, the disposable funnel is squeezed with sufficient force until juice separated from the fruit wedge squirts into the bottle and the fruit wedge 70 is expelled through the outlet 20 to substantially reside in the bottle or container. After the fruit wedge 70 is inserted through the inlet 10, the fruit wedge need not be touched by hand and the entire apparatus can be re-used in a sanitary manner. In operation, the apparatus can be squeezed by machine or by hand as illustrated.

Figure 7:
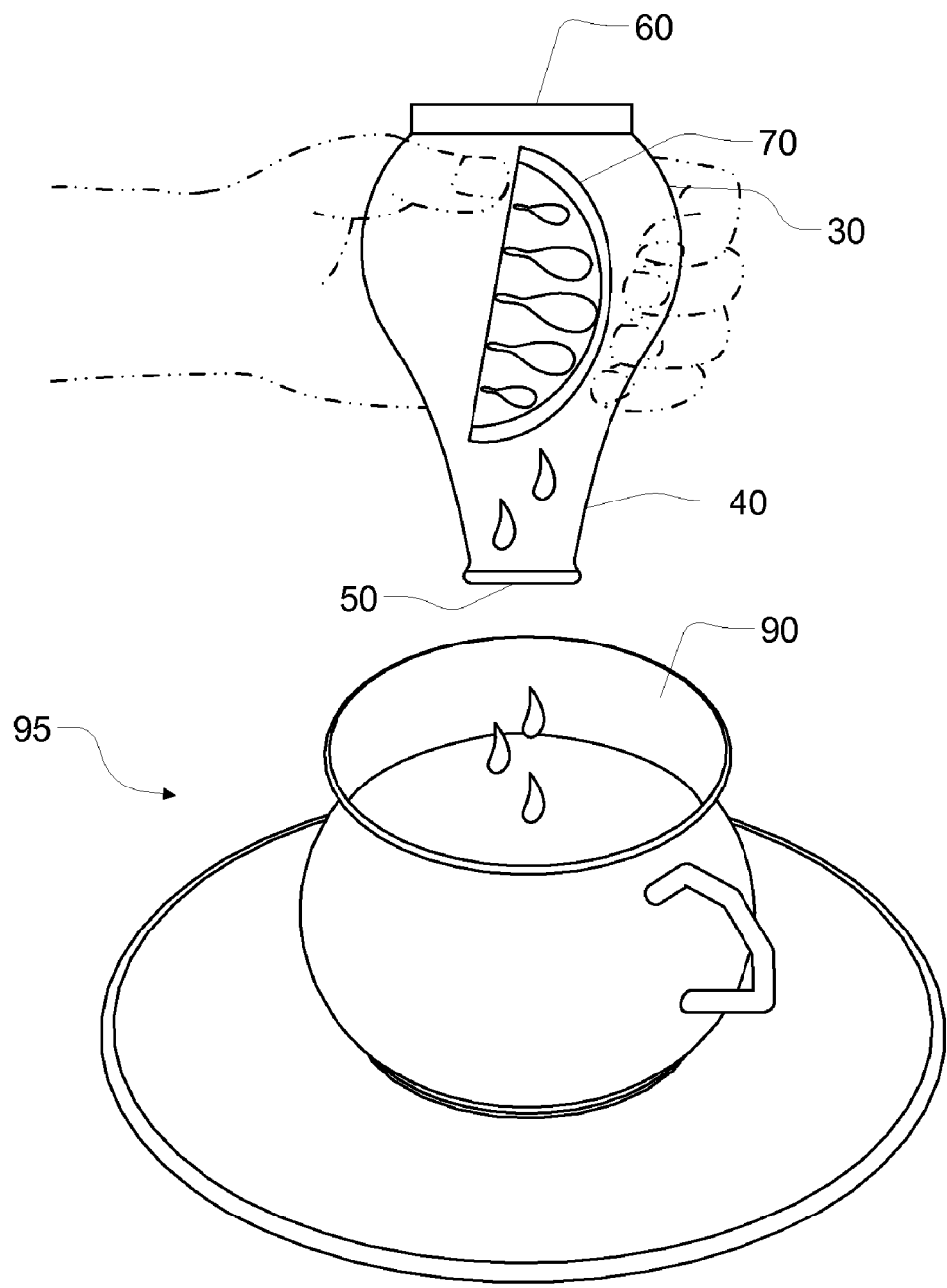
FIG. 7 shows another exemplary embodiment of an apparatus for squeezing a fruit wedge in operation.

FIG. 7 illustrates the operation of an exemplary embodiment of the apparatus for squeezing fruit, in which the outlet 20 is inserted into a tea cup 95. In operation, the apparatus can be squeezed by machine or by hand as illustrated.

Figure 8:
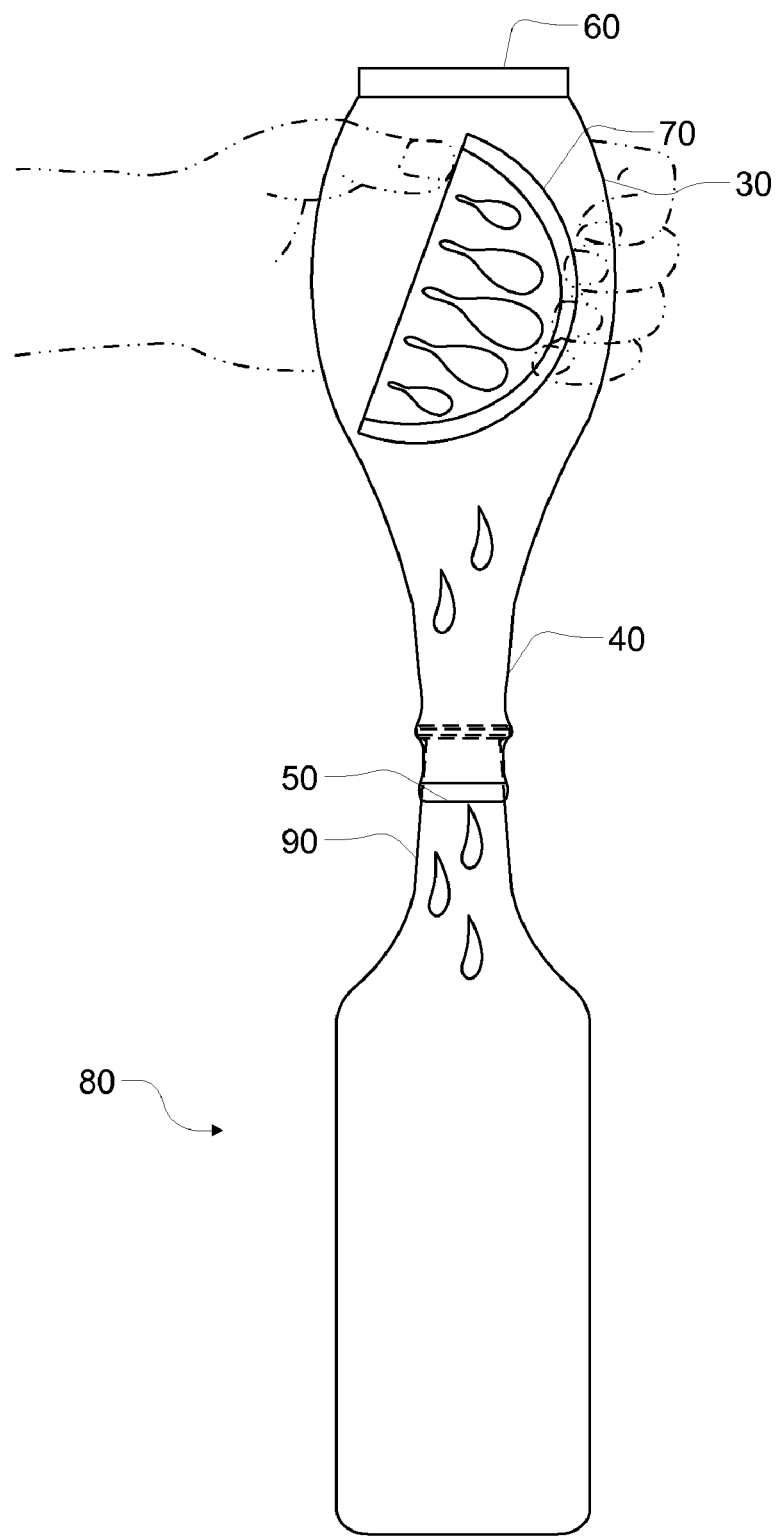
FIG. 8 shows another exemplary embodiment of an apparatus for squeezing a fruit wedge in operation.

FIG. 8 shows the operation of an alternative exemplary embodiment of the apparatus for squeezing fruit, in which the outlet 20 is stretched over the neck 80 of a bottle 90. In operation, the apparatus can be squeezed by machine or by hand as illustrated.

Figure 9:
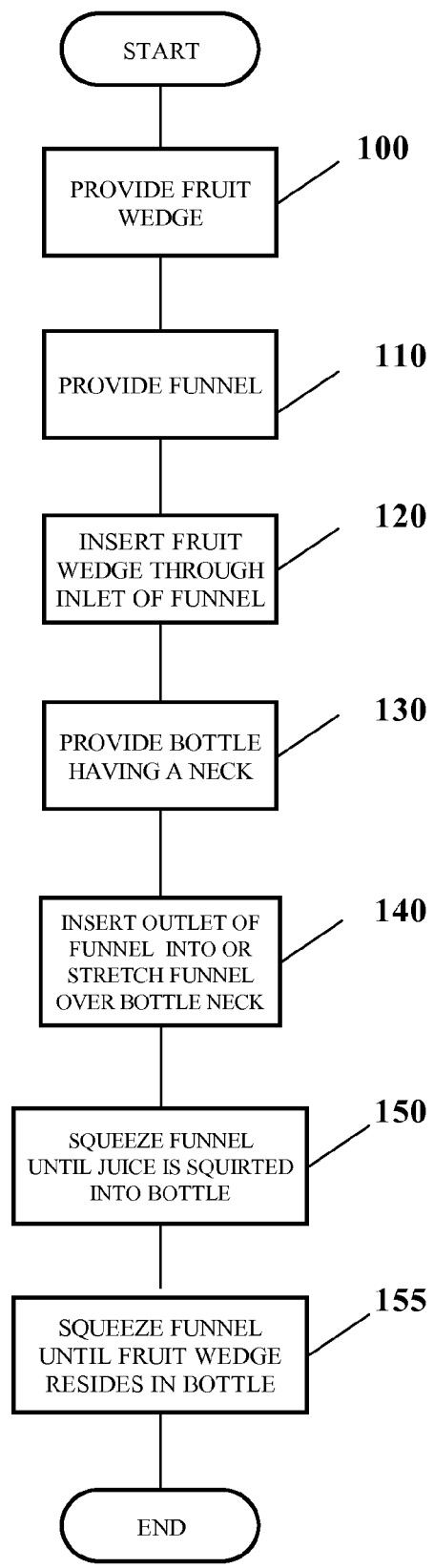
FIG. 9 shows a flow chart of an exemplary embodiment of a method for squeezing a fruit wedge.

FIG. 9 shows a flow chart of an exemplary embodiment of a method for squeezing a fruit wedge. This embodiment includes the steps of providing a fruit wedge 100, providing a disposable funnel 110, inserting the fruit wedge through the inlet 120, providing a bottle having a neck 130, inserting the outlet of the disposable funnel into or onto the neck of the bottle 140 and, squeezing the disposable funnel until juice separated from the fruit wedge is squirted through the outlet into the bottle 150 and until the fruit wedge is expelled from the disposable funnel to substantially reside in the bottle 155. These steps may be executed in any order, except that the steps of providing the fruit wedge 100 and providing the disposable funnel 110 should precede the step of inserting the fruit wedge through the inlet 120 and, the step of providing the bottle having a neck 130 should precede the steps of inserting the outlet into or onto the bottle neck 140 and, squeezing the disposable funnel until juice separated from the fruit wedge is squirted through the outlet into the bottle 150 and the fruit wedge is expelled from the funnel to substantially reside in the bottle 155.

Figure 10:
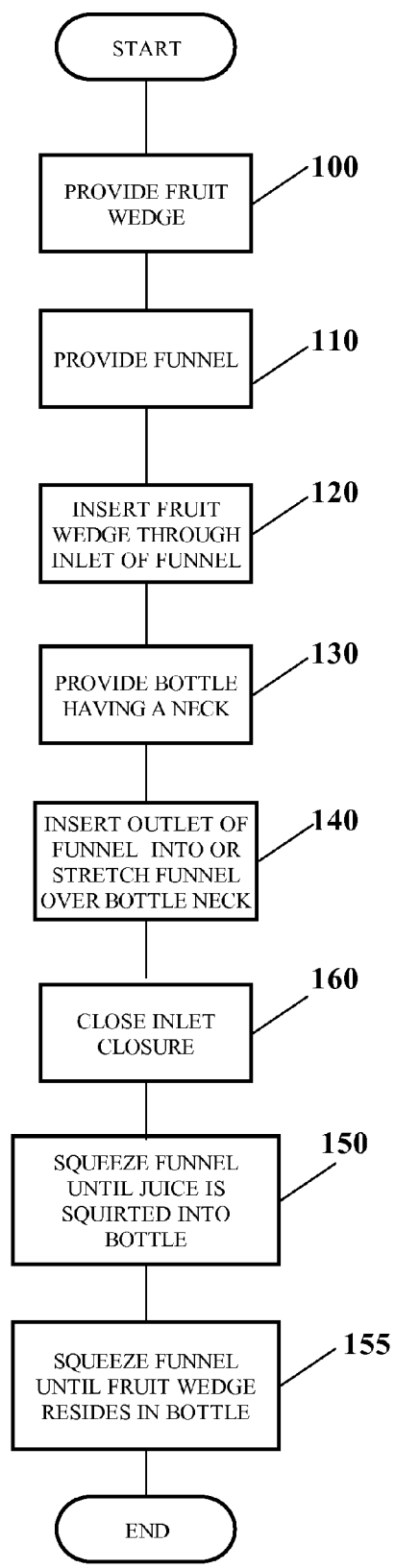
FIG. 10 shows a flow chart of another exemplary embodiment of a method for squeezing a fruit wedge.

FIG. 10 shows a flow chart of another exemplary embodiment of a method for squeezing a fruit wedge. This embodiment includes the steps of providing a fruit wedge 100, providing a disposable funnel 110, inserting the fruit wedge through the inlet 120, providing a bottle having a neck 130, inserting the outlet of the disposable funnel into or stretching the funnel over the neck of the bottle 140, closing the inlet closure 160 and, squeezing the disposable funnel until juice separated from the fruit wedge is squirted through the outlet into the bottle 150 and the fruit wedge is expelled from the funnel to substantially reside in the bottle 155.

Figure 11:
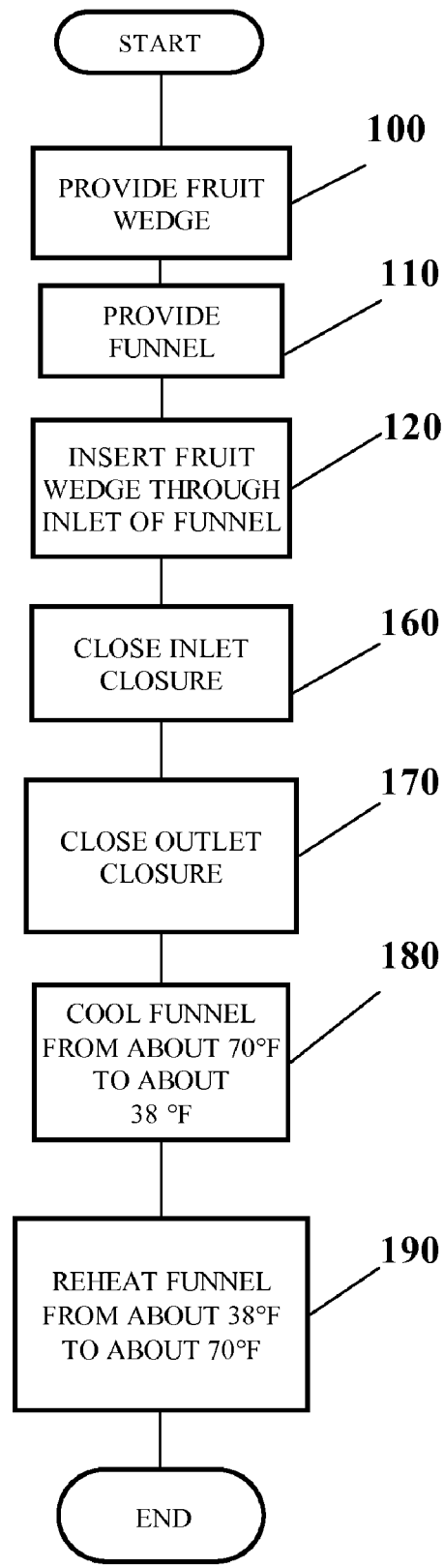
FIG. 11 shows a flow chart of yet another exemplary embodiment of a method for squeezing a fruit wedge.

FIG. 11 shows a flow chart of yet another exemplary embodiment of a method for squeezing a fruit wedge. This embodiment includes the steps of providing a fruit wedge 100, providing a disposable funnel 110, inserting the fruit wedge through the inlet 120, closing the inlet closure 160, closing the outlet closure 170, cooling the disposable funnel from about 70° F. to about 38° F. 180 and, reheating the disposable funnel from about 38° F. to about 70° F. 190.

While exemplary embodiments of the present invention have been shown and described, various modifications may be made without departing from the scope of the present invention. The invention, therefore, should not be limited, except to the following claims and their equivalents.

I claim:

1. A method, comprising the steps of:
providing at least one fruit wedge;
providing a disposable funnel;
inserting said fruit wedge through said inlet of said disposable funnel until said fruit wedge is substantially enclosed by said disposable funnel;
providing a bottle having a neck;
inserting said outlet of said disposable funnel into or stretching said outlet over said neck of said bottle;
squeezing said disposable funnel until juice separated from said fruit wedge is squirted through said outlet into said bottle; and,
squeezing said disposable funnel with sufficient force until said fruit wedge is expelled from said disposable funnel to substantially reside in said bottle.

2. A method according to claim 1, wherein said disposable funnel is
formed from a substantially non-porous stretchable material, said disposable funnel having sufficient capacity to substantially enclose at least one fruit wedge, said disposable funnel having an inlet and an outlet, wherein said inlet has a closure and said disposable funnel has substantially circular cross-section, further comprising an upper body portion thereof and a lower body portion thereof, wherein said lower body portion has a maximum diameter in the direction orthogonal to the longitudinal axis of said disposable funnel substantially less than the maximum diameter of said upper body portion in the direction orthogonal to the longitudinal axis of said disposable funnel.

3. A method according to claim 2, wherein said lower body portion further comprises a rim formed of one piece with said lower body portion.

4. A method according to claim 3, wherein said rim is sealingly connected to said lower body portion.

5. A method, according to claim 3, wherein said stretchable material is substantially formed from an elastomer.

6. A method according to claim 5, wherein said inlet has a first closure.

7. A method according to claim 6, wherein said outlet has a second closure.

8. A method according to claim 6, wherein said first closure is at least one selected from the group consisting of zip lock closure, drawstring closure and adhesive closure and combinations thereof.

9. A method according to claim 7, wherein said second closure is at least one selected from the group consisting of zip lock closure, drawstring closure and adhesive closure and combinations thereof.

10. A method according to claim 6, wherein said first closure is a zip lock closure.

11. A method according to claim 7, wherein said second closure is a zip lock closure.

12. A method according to claim 7 further comprising the step of closing said first closure and said second closure until said first closure and said second closure are substantially closed.

13. A method according to claim 12 further comprising the steps of cooling said disposable funnel from about 70 F temperature to about 38 degrees Fahrenheit and, reheating said disposable funnel from about 38 degrees Fahrenheit to about 70 degrees Fahrenheit.

* * * * *